United States Patent

[11] 3,604,059

| [72] | Inventors | Stephen Liddell<br>Fort Worth;<br>Bill Matheson, Euless, both of, Tex. |
|---|---|---|
| [21] | Appl. No. | 797,179 |
| [22] | Filed | Feb. 6, 1969 |
| [45] | Patented | Sept. 14, 1971 |
| [73] | Assignee | Crown Molding Co.<br>Dallas, Tex. |

[54] PRESSURE FILL SYSTEM
4 Claims, 1 Drawing Fig.

[52] U.S. Cl........................................................ 18/5 P,
18/30 GA
[51] Int. Cl............................................... B29d 27/04
[50] Field of Search........................................... 18/5 P, 12
F, 30 AA, 30 GA, 30 GH, 30 GM, 30 GS

[56] References Cited
UNITED STATES PATENTS

| 3,179,134 | 4/1965 | Sigrist............................ | 18/30 GA X |
| 3,375,309 | 3/1968 | Stevens........................... | 18 X/30 GA X |

*Primary Examiner*—H. A. Kilby, Jr.
*Attorney*—Parker, Carter & Markey

ABSTRACT: A pressure fill system for a molding machine used for making plastic cups and the like. A pressure chamber in the material supply conduit is provided with a valve which is opened to feed into a filler cavity and closed while the chamber is pressurized and the material conveyed into the mold cavity.

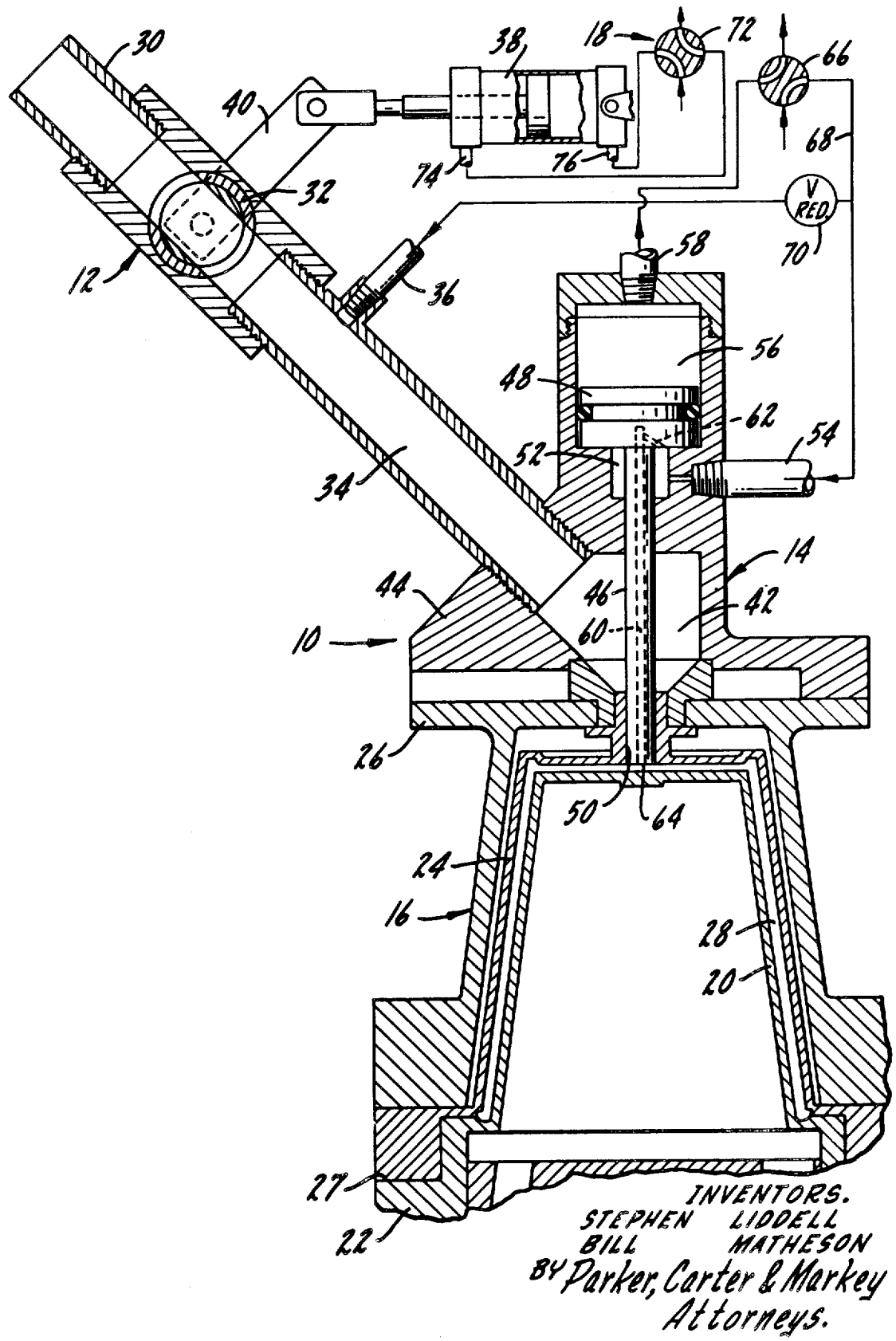

PRESSURE FILL SYSTEM

SUMMARY OF THE INVENTION

This invention relates to molding machine systems and more particularly relates to molding machines for producing plastic articles such as expanded polystyrene cups, and the like.

Conventional molding machines of the type described operate through a series of cycles including filling the mold cavity with expandable plastic beads, closing the cavity, heating and expanding the beads, cooling the mold, opening the mold, ejecting the molded article, and closing the mold. The overall efficiency of this operation can be materially improved where the time element for any of these steps can be reduced, especially where a large number of articles are to be molded by the machine. The present invention provides a method and apparatus for reducing the time for the filling step.

The invention also has application in molding relatively thin-walled plastic articles in which the raw plastic bead material must be of extremely small dimensions, such as down to 70 mesh. For example, thin-walled cups are desirable in many applications, especially vending machines where the use of thick-walled cups will reduce the number which can be stacked for dispensing. Thin-walled cups not only increase storage capacity, but also increase the number of cups which can be stacked and packaged for shipment in a container of given size. Conventional molding equipment does not produce good quality thin-walled cups with regular sized bead material, as the beads are not distributed uniformly throughout the mold cavity during the filling operation. When the small beads are used on conventional molding machines air from the fill tip will tend to blow the beads back, thus leaving a hole in the cup end. The present invention will produce high quality thin-walled cups using small polystrene beads without producing holes in the plastic.

Accordingly, it is an object of this invention to provide a pressure fill system for a plastic molding machine in which the time required for the material fill cycle is substantially reduced.

Another object is to provide a pressure fill system for introducing expandable plastic bead material of relatively small dimensions into a mold cavity suitable for molding relatively thin-walled plastic cups.

Another object is to provide a pressure fill system for a molding machine in which a pressure chamber in the supply conduit is closed off at its inlet end and pressurized for feeding plastic bead material into the mold cavity, and in which the chamber is depressurized and opened at its inlet for receiving a fresh charge of material as a valve feeding the mold cavity is closed.

Another object is to provide a molding machine having a pressurized fill tip and plunger arrangement for directing plastic bead material into a mold cavity and with a pressure chamber having a valve communicating with the material supply, and including a control circuit operating to first close the valve, then open the plunger end and pressurize the fill tip and pressure chamber, and then close the valve and plunger while depressurizing the fill tip and pressure chamber.

Another important object is to provide a method of forming plastic articles in a mold cavity in which a pressure chamber containing a charge of raw bead material is first closed off from a material supply and them pressurized while opened to the mold cavity to convey the material into the cavity, after which the cavity is closed and the chamber depressurized and opened to receive a charge for the next filling cycle.

DESCRIPTION OF THE DRAWINGS

In the drawings, the single FIGURE illustrates in vertical cross section a molding machine incorporating features of the invention.

DETAILED DESCRIPTION

Referring to the single FIGURE a preferred form of a molding machine adapted to mold articles from foamable plastic particulate material is illustrated generally at 10. Molding machine 10 preferably is used to mold articles such as plastic drinking cups, although it would find application for molding a wide variety of articles of various sizes and configurations.

Molding machine 10 comprises a particulate material supply device 12 which directs the raw material into filling apparatus 14 which in turn fills mold 16. Coordination of supply device 12 and filling apparatus 14 is provided by control circuit 18. This control circuit is a part of an overall control means, not shown, for cycling the molding machine throughout the closing, filling, heating, cooling and ejection cycles. The control means may be of the type disclosed in U.S. Pat. No. 3,224,037, assigned to the same assignee as the present invention.

Mold 16 comprises a male or core member 20 mounted on platen 22 for movement to and from the female or cavity member 24. The cavity member is shown as mounted on a fixed base or support 26, although it could be otherwise with the core member suitably anchored and the cavity member movably mounted. The parting line between the core and cavity members is indicated at 27.

Mold cavity 28 defined by the male and female members in their closed position has an open-ended cup configuration. The mold parts are closely spaced apart so that the resulting molded article has relatively thin walls. This is highly important in the vending machine industry where thin-walled cups permit a large number to be stacked in a dispensing machine.

Cups of the type described are molded from plastic in the form of small pellets or beads with an absorbed foaming agent expanded under the influence of heat in the mold. The preferred bead material is polystyrene infused with a foaming agent such as a hydrocarbon which may be methyl chloride, butane, or heptane, and the like. The beads may be heated by suitable means such as steam directed against the mold surfaces. As the foaming agent is expanded, the beads will expand in the mold and fuse together to form the molded article.

The polystyrene beads may be delivered by gravity from a suitable hopper or source, not shown, through conduit 30 into supply device 12. Supply device 12 comprises a valve 32, shown as a ball valve, opening and closing communication from the hopper into pressure chamber 34, which may be a cylinder or conduit having an air inlet 36 at its upper end. Valve 32 is moved between its open and closed position by means of air cylinder 38 connected with valve operating arm 40.

During a filling cycle chamber 34 functions to continually move a charge of beads into filling apparatus 14. The preferred form illustrated incorporates air pressure to move the beads, although it could be otherwise as, for example, with a plunger, not shown, slidably operated in chamber 34 to force the beads downwardly.

The lower end of pressure chamber 34 is in communication with a filler cavity 42 formed in housing 44 of filling apparatus 14. The filling apparatus includes a plunger 46 moved by gas or air-operated piston 48 to and from a bore 50 in base 26. The bore is in communication with the interior of mold cavity 28.

The piston and plunger are moved to the upper position by air pressure in chamber 52 delivered through conduit 54, and to the lower position by pressure in chamber 56 delivered through conduit 58. A bore or passageway 60 through the plunger communicates at one end by means of passageway 62 with chamber 52, and at its lower end with plunger filler tip 64. During the upward stroke and position of the plunger a jet of air will flow through the filler tip and convey or blow beads in filler cavity 42 through bore 50 and into the mold cavity. Air blowing into the cavity escapes through a suitable opening or openings, not shown, around the periphery of the cavity bottom at the parting line. The opening is sufficiently small enough to prevent escape of the beads while the cavity is filling. In its downward position plunger 46 functions as a valve or plug shutting off the flow of material into the mold cavity.

A two-way control valve 66 is provided to direct air through conduit 68 into branch conduit 54 for raising plunger 46 and into branch conduit 36 for pressurizing chamber 34, or into branch conduit 58 for lowering the plunger while chamber 34 is depressurized. The pressure delivered through conduit 54 for operating the plunger may be maintained at approximately 80 p.s.i., and this is preferably reduced by pressure reducing valve 70 to approximately 50 p.s.i. for delivery into the pressure chamber. It is understood that these pressures are given as examples only, and may be varied in accordance with particular design considerations and results desired. With control valve 66 operated to a position 90° from that shown, air delivered through conduit 58 operates the plunger downwardly to close bore 50, while at the same time chamber 34 is depressurized through valve 66.

Control valve 72 is provided to direct air into either port 74 of cylinder 38 to open valve 32, or into port 76 to close the valve. Operation of valve 73 may be controlled in timed relationship with that of valve 66 so valve 32 closes just prior to pressurization of chamber 34 and upward movement of plunger 46. Timing of the valves in this manner may be accomplished by means of conventional timing mechanisms, not shown.

In operation, at the start of a molding cycle with the mold parts closed and plunger 46 in its lower position, ball valve 32 is open so that a charge of plastic beads is supplied through conduit 30 by gravity into pressure chamber 34 and filler cavity 42. The total volume of filler cavity 42 and pressure chamber 34 is not critical as long as there is more than enough bead capacity for filling the mold cavity during each cycle. At the start of the filling cycle calve 72 may first be operated by the timer circuit to actuate cylinder 38 and close ball valve 32. Following this, valve 66 is operated to direct air into chamber 52 to raise the plunger, and through conduit 36 to pressurize chamber 34. Air pressure in chamber 34 will move the charge downwardly into the filler cavity where the jet of air issuing from filler tip 64 conveys the beads into the cavity.

After a predetermined time control circuit 18 operates valve 66 and 72 to depressurize chamber 34, open ball valve 32, and pressurize chamber 56 to move plunger 46 downwardly and close off bore 50. The filled mold is now ready for the subsequent cycles of heating, cooling, opening and ejection to complete the finished article. At the same time, additional plastic beads are fed through valve 32 into filler cavity 42 for the start of the next filling cycle.

The pressurization of chamber 34 during the filling cycle substantially reduces the fill time, no matter what the bead size may be. Where many repetitive cycles are made, such as on a production run of thousands of cups, the efficiency of the molding machine is therefore substantially improved. In one operative embodiment it was found that the invention cut the fill time from two seconds to approximately one-half second.

While the embodiment herein is at present considered to be preferred, it is understood that many changes and modifications may be made by those skilled in the art within the spirit and scope of the invention as expressed in the appended claims.

1. In a machine for molding thin-walled cups from foamable polystyrene beads, a mold cavity defining a cup and constructed to be open and closed so that a cup may be molded therein and removed, a fill port communicating with the mold cavity at what will be the bottom of the cup, a movable plunger aligned with the fill port constructed to open and close it, source of pressure air at the fill port for blowing beads into the molding cavity, a pressure chamber connected to the fill port through which beads move to the fill port, an entrance valve at the entrance to the pressure chamber through which beads pass on their way to the pressure chamber from a source of bead supply, and a source of pressure air connected to the pressure chamber constructed to pressurize the chamber when the entrance valve is closed to thereby prevent reverse flow of the beads.

2. The structure of claim 1 further characterized in that the source of pressure air at the fill port is in the form of an air passage through the movable plunger.

3. The structure of claim 1 further characterized in that the entrance valve is in the form of a rotatable ball valve.

4 The structure of claim 2 further characterized by and including means for operating the entrance valve, the movable plunger and the source of pressure air connected to the pressure chamber such that the entrance valve is closed first after which the plunger is raised to open the fill port and the pressure chamber is pressurized.